(12) United States Patent
Koester

(10) Patent No.: US 7,345,597 B2
(45) Date of Patent: Mar. 18, 2008

(54) PROCESS TO DETERMINE THE ABSOLUTE ANGULAR POSITION OF A MOTOR VEHICLE STEERING WHEEL

(75) Inventor: Michael Koester, Dortmund (DE)

(73) Assignee: Leopold Kostal GmbH & Co. KG, Ludenscheid (DE)

(*) Notice: Subject to any disclaimer, the term of this patent is extended or adjusted under 35 U.S.C. 154(b) by 99 days.

(21) Appl. No.: 11/481,504

(22) Filed: Jul. 6, 2006

(65) Prior Publication Data

US 2007/0152143 A1    Jul. 5, 2007

(30) Foreign Application Priority Data

Jul. 14, 2005    (DE) ............... 10 2005 032 869

(51) Int. Cl.
*H03M 1/22* (2006.01)

(52) U.S. Cl. ............................ 341/13; 341/3

(58) Field of Classification Search ............... 341/1–15
See application file for complete search history.

(56) References Cited

U.S. PATENT DOCUMENTS

| 4,465,373 A | 8/1984 | Tamaki et al. |
| 4,631,519 A | 12/1986 | Johnston |
| 4,901,073 A * | 2/1990 | Kibrick ................ 341/13 |
| 5,602,544 A * | 2/1997 | Takahashi et al. ........... 341/6 |
| 5,802,206 A | 9/1998 | Marold |
| 6,304,190 B1 | 10/2001 | Blasing |
| 6,459,389 B1 | 10/2002 | Germuth-Loffler et al. |

FOREIGN PATENT DOCUMENTS

| DE | 40 22 837 A1 | 1/1992 |
| DE | 195 00 817 C1 | 2/1996 |
| DE | 197 58 104 A1 | 7/1999 |
| DE | 102 33 155 A1 | 2/2004 |
| EP | 01 16 636 | 8/1984 |
| EP | 09 91 918 | 4/2000 |
| JP | 2005030776 | 2/2005 |

* cited by examiner

*Primary Examiner*—Lam T. Mai
(74) *Attorney, Agent, or Firm*—Brooks Kushman P.C.

(57) ABSTRACT

A method for determining absolute value of a rotational angle includes imaging a segment of a code track onto a sensor such that the sensor generates a corresponding output signal. The track includes a code in the form of a light and dark transition pattern over an angular range. The code contains code words with each code word corresponding to a respective angular value. The code word of the imaged segment is determined from the position of the transitions in the output signal to determine the angular value of the imaged segment. The position of the transitions in the output signal is compared with a reference curve to determine position deviations between the output signal and the reference signal. The reference curve represents the transitions expected in the output signal in the absence of unwanted mechanical influences. The unwanted mechanical influences are determined as a function of the determined deviations.

8 Claims, No Drawings

PROCESS TO DETERMINE THE ABSOLUTE ANGULAR POSITION OF A MOTOR VEHICLE STEERING WHEEL

CROSS-REFERENCE TO RELATED APPLICATIONS

This application claims priority to DE 10 2005 032 869.5, filed Jul. 14. 2005 in Germany, which is hereby incorporated by reference in its entirety.

BACKGROUND OF THE INVENTION

1. Field of the Invention

The invention relates to a process for determining the absolute value of a rotational angle, in particular the angular position of a motor vehicle steering wheel, by means of a transceiver comprising a light source and a sensor array having a multiplicity of optoelectronic transducers, and a code carrier arranged so that the code carrier can rotate with respect to the transceiver, the code carrier has a unique, single-track encoding of the angular values, a continuous segment of the encoding being imaged on the sensor array, and the output signal of the sensor array being evaluated to determine a code word corresponding to the current angular value.

2. Background Art

The absolute angular position of the steering wheel, also called the steering angle, is needed in motor vehicles so that this value can be supplied to a vehicle movement dynamics control system, for example. In addition to the mentioned steering angle value, such a vehicle movement dynamics control system receives other measurement data, such as the wheel speed or the rotation of the motor vehicle about its vertical axis. First the absolute steering angle and second the steering speed are needed so that these values, along with the other captured data, can be evaluated by the vehicle movement dynamics control system and converted to control actuators, for example the brakes and/or the engine management system.

DE 40 22 837 A1 discloses an optoelectronic steering angle sensor that is suitable to accomplish such a process. The steering angle sensor described in this document comprises an electronic control unit and a sensor unit consisting of two elements that are arranged so that they are parallel to one another and at a distance from one another—a light source and a line sensor—and, arranged between the light source and the line sensor, an encoder disk, which is connected with the steering shaft in a torsionally rigid manner. The line sensor provided is a CCD sensor. The encoding provided in this encoder disk is a light slit extending over 360° in the shape of a spiral of Archimedes. The illumination of corresponding transducers of the line sensor at a certain steering angle makes it possible to derive information about the actual steering angle position. The spiral of Archimedes used as the encoding is continuous, so that it can be spoken of as an analog encoding. However, using the same arrangement it is just as possible to read a digital encoding on the encoder disk.

DE 197 58 104 A1 (corresponding to U.S. Pat. No. 6,459,389) discloses a process for determining the absolute value of a rotational angle. This process involves evaluating sharp signal changes, generally referred to as edges, in the sensor array's output signal to convert the signal into a contrast difference. A microcontroller decodes the contrast differences by comparing them with a black-and-white pattern representing the angle information.

Although in theory this process is able, under ideal conditions, to solve the problem of determining the sought-after angular value, in reality the unavoidable mechanical tolerances of the entire optical system, on the one hand, and especially the mounting of the code carrier, on the other hand, cause clear deviations in the position of the edges, and thus also the contrast differences derived from them. Therefore, when this process is used, it is proposed that these influences be compensated by additional measures, which involve illuminating the encoding from different directions with two light sources, or using two sensor arrays with one light source that is supplied to both of them. However, this means that in every case an additional hardware expenditure is required.

SUMMARY OF THE INVENTION

Starting from this background art which has been discussed, the invention therefore has the goal of further developing a process of the type mentioned at the beginning to make it possible to determine the influences due to mechanical tolerances, in particular for the purpose of subsequent compensation, and to do so without additional hardware expenditure.

The process according to the invention accomplishes this by comparing the actual position of the light/dark transitions on the sensor array with a curve representing ideal relationships, and using the distribution and size of the deviations from this curve to determine the tolerance deviations in the geometric structure of the measuring system.

When this is done, it is possible to determine both static and dynamic tolerance deviations in the geometric structure of the measuring system, which can then be used to generate corrections to compensate the influences of these deviations on the measurement result.

A preferred embodiment of the process involves determining to a first approximation a mean minimum line width of the image of the encoding on the sensor array, which is done by comparing the actual position of the light/dark transitions with an equally spaced grid.

It is especially preferred for this comparison of the position of the light/dark transitions with the equally spaced grid to be done by means of a linear regression, which involves plotting the known positions on an equally spaced grid, and determining the line with the minimum standard deviation, the slope of the lines then providing the measure of the mean minimum line width of the image of the encoding on the sensor array and the line's axis segment giving the geometric position of the encoding in relation to the sensor array.

Further advantages and embodiments of the invention and the following description of an embodiment will now be described.

DETAILED DESCRIPTION OF THE PREFERRED EMBODIMENTS

This embodiment starts from an angular position sensor arrangement, in which a code carrier that has a code track representing a digital encoding of the angular values, is mounted so that the code carrier can rotate with respect to an optoelectronic transceiver. This code track represents a unique encoding of the angular values from 0 to 360°, and the transceiver's receiver is formed by a line sensor formed by a plurality of photodiodes, a so-called photodiode array (PDA). This example uses a PDA that has 128 individual photodiodes, also called pixels. This PDA is illuminated by the light transmitter associated with it, for example a light-emitting diode (LED), the transmitted light passing through the code carrier containing the encoding. The encoding is made, e.g., by a sequence of light-transmitting openings in the code carrier, which consists of an opaque material. If the illumination passes through this encoding in a radial direction, the encoding is realized as a track running around the outside of the cylindrical lateral surface of a corresponding code carrier, and if the illumination passes through it in the axial direction, it is realized as an annular track with a constant average radius on an encoder disk.

Illumination through this encoding will image, on the PDA, a light distribution representing the corresponding angular position. Depending on the desired resolution of the angular encoding and the other geometric relationships, the result is a minimal line width of the image of the encoding on the PDA. Thus, here the shortest distance between two light/dark transitions of the light distribution on the PDA should be described, which, in the sample embodiment in question, corresponds to an angular distance of one degree on the code carrier, that is a length of approximately 10 pixels on the PDA.

Assuming that the code carrier's encoding, which results from the unwinding of the curved track on the code carrier in the peripheral direction, has a constant true minimal line width, the fact that the encoding forms a curved track, but is imaged on a straight sensor, causes a systematic change in the actual minimal line width of the image on the straight sensor, as a function of its position on it. The reason for this is that while the mean minimum line width of the image over the sensor would be constant if the encoding had a linear extension, the curved encoding track has the effect that the actual mean minimum line width of the image assumes a minimum value in the middle of the PDA and increases in the direction toward the edges of the PDA, given otherwise ideal geometric relationships. Any deviation of the structure from the ideal geometric configuration causes a change in the course of this systematic deviation. It is precisely this that the process according to the invention takes advantage of, by allowing inferences to be drawn, from the type and size of this change in the deviation, about the tolerances causing it, and to make corresponding corrections in the measured values.

Thus, the output signal of the PDA caused by the light distribution forms the starting point of this process, in which this output signal is used to determine the underlying angle information.

To accomplish this, first the position of the light/dark transitions in the light distribution on the PDA is determined. This can done, for example, by detecting the edges present in the signal, as is described in the previously mentioned background process, or by a one-step or multiple-step correlation process which involves correlating the PDA's output signal with a reference signal by means of a convolution operation.

The last-mentioned correlation process involves taking the PDA signal, which can contain various interference in addition to the desired information, and convoluting it in a correlation filter with a filter function, which makes it possible to reconstruct the light/dark pattern from the PDA signal and to determine its position with respect to the PDA. The filter function used to do this is a reference signal curve, which represents either the entire code sequence over 360° or a relatively short segment of it. Such a segment can be, for example, a step function or a jump function, which, given an appropriate minimal line width, has the signal jump corresponding to a light/dark transition approximately in the middle. The result of this filtering is always a correlation function, whose pronounced extrema contain the information about the sequence of light/dark transitions and about their position in relation to the PDA.

The positions of the light/dark transitions on the PDA, which are known in this way, simultaneously contain the information about the already discussed actual mean minimum line width of the image of the encoding on the PDA, and about its course as a function of the position on the PDA.

The type of encoding means that, if it is linear, each distance between each two consecutive light/dark transitions must correspond exactly to an integral multiple of the minimal line width of the image on the PDA. This is also at least approximately the case if the track of the encoding is curved, despite the systematic deviation just described, so that an approach that starts from this assumption makes a good first approximation, starting from which it is then possible to refine the result.

The process according to the invention takes advantage of this circumstance by adapting a grid with equal but variable distances to the sequence of light/dark transitions. For example, this can be done using a linear regression, which involves plotting the known positions on an equally spaced grid, and applying the least squares method to determine the regression line. The slope of the fitted lines then provides the sought-after measure of the mean minimum line width best representing the real relationships.

In addition, the axis segment of these lines also reproduces the geometric position of the code in relation to the PDA. Here it is especially noteworthy that this position is determined not by using a single edge, for example, as is the case in the process already previously known from the background art. Instead, here the position of the code in relation to the PDA is determined from all the information of the PDA signal, so that the information obtained represents a statistical value with subpixel precision.

In the ideal case of a tolerance-free geometric structure with a linear encoding, all light/dark transitions would lie on the line that is determined, and this would be true over the entire encoding, the only deviation from this line being statistical, i.e., randomly distributed.

In the ideal case of a tolerance-free geometric structure with a curved encoding, all light/dark transitions would lie on an approximately parabolic curve surrounding the line that is determined, with a minimum in the center of the PDA, the only deviations from this curve also being statistical, i.e., randomly distributed.

However, radial and tangential displacements of the encoding and the PDA actually occur with respect to one another, especially due to tolerances in the axis or the mounting of the code carrier, errors in the printing of the code, or tilting and/or displacement of the PDA or the circuit board. These deviations from the previously assumed ideal geometry produce deviations in the position of the light/dark transitions from the ideal curve, from which the type of the deviation is not only uniquely identifiable but can also be compensated in the result through corresponding corrective measures.

Thus, for example, errors in the distance between the code carrier's axis of rotation and the PDA express themselves as a change in the curvature of the curve, a greater distance causing the curve to have a smaller curvature, and a smaller distance causing it to have a larger one. Therefore, the curvature of the curve makes it possible to draw an inference about the radial deviation of the mounting.

Tangential, i.e., lateral displacements of the PDA out of its ideal position cause a displacement of the curve's minimum out of the center toward one or the other ends of the PDA.

These and other combined deviations from the ideal position of the code carrier and the PDA with respect to one another can be determined from the course of the curve and compensated by corresponding corrections. When this is done, both static deviations, that is those caused by the structure, and dynamic ones, i.e., those varying during the course of the movement of the code carrier, are recorded.

To accomplish this, every angular calculation cycle involves determining the positioning error between the code carrier and the PDA in the form of a vector, that is, with a magnitude and a direction, and converting it into an angular correction which is applied to the measured angle before it is output or before it undergoes further processing by downstream control units.

What is claimed is:

1. A method for determining the absolute value of a rotational angle, the method comprising:

imaging a continuous segment of a code track of a code carrier onto a sensor array such that the sensor array generates a corresponding output signal, wherein the code track includes a code in the form of a light and dark transition pattern provided over an angular range of 360°, wherein the code contains a plurality of code words with each code word corresponding to a respective angular value in the angular range;

determining the code word of the imaged segment of the code track from a position of the light and dark transitions in the sensor array output signal to determine the angular value of the imaged segment of the code track;

comparing the position of the light and dark transitions in the sensor array output signal with a reference curve to determine distribution and magnitude of position deviations between the sensor array output signal and a reference signal, wherein the reference curve represents the light and dark transitions which are expected in the sensor array output signal in an absent of unwanted mechanical influences effecting the code carrier and the sensor array; and determining the unwanted mechanical influences as a function of the determined distribution and magnitude position deviations.

2. The method of claim 1 wherein:

the determined unwanted mechanical influences include static and dynamic unwanted mechanical influences effecting the code carrier and the sensor array.

3. The method of claim 1 further comprising:

modifying the determined angular value of the imaged segment of the code track to account for the determined unwanted mechanical influences.

4. The method of claim 1 further comprising:

determining a first approximation of a mean minimum line width of the light and dark transitions in the sensor array output signal by comparing the position of the light and dark transitions in the sensor array output signal with an equally spaced grid.

5. The method of claim 4 wherein:

comparing the position of the light and dark transitions in the sensor array output signal with an equally spaced grid involves includes using a linear regression by plotting the position of the light and dart transitions in the sensor array output signal on the equally spaced grid and determining the line with the minimum standard deviation.

6. The method of claim 5 futher comprising:

a slope of the determined line is indicative of the mean minimum line width of the light and dark transitions in the sensor array output signal and the axis segment of the determined line is indicative of the geometric position of the code track in relation to the sensor array.

7. The method of claim 1 wherein:

determining the code word of the imaged segment of the code track from the position of the light and dark transitions in the sensor array output signal to determine the angular value of the imaged segment of the code track includes evaluating edges of the sensor array output signal.

8. The method of claim 1 wherein:

determining the code word of the imaged segment of the code track from the position of the light and dark transitions in the sensor array output signal to determine the angular value of the imaged segment of the code track includes convoluting the sensor array output signal with a reference signal representing the code in a correlation filter to form a correlation function whose extrema reproduce the position of the light and dark transitions in the sensor array output signal.

* * * * *